Sept. 8, 1925.
J. P. BRADNER
1,552,982
METHOD OF AND APPARATUS FOR MEASURING AND LOCATING DYNAMIC UNBALANCE
Filed Nov. 5, 1923
2 Sheets-Sheet 1
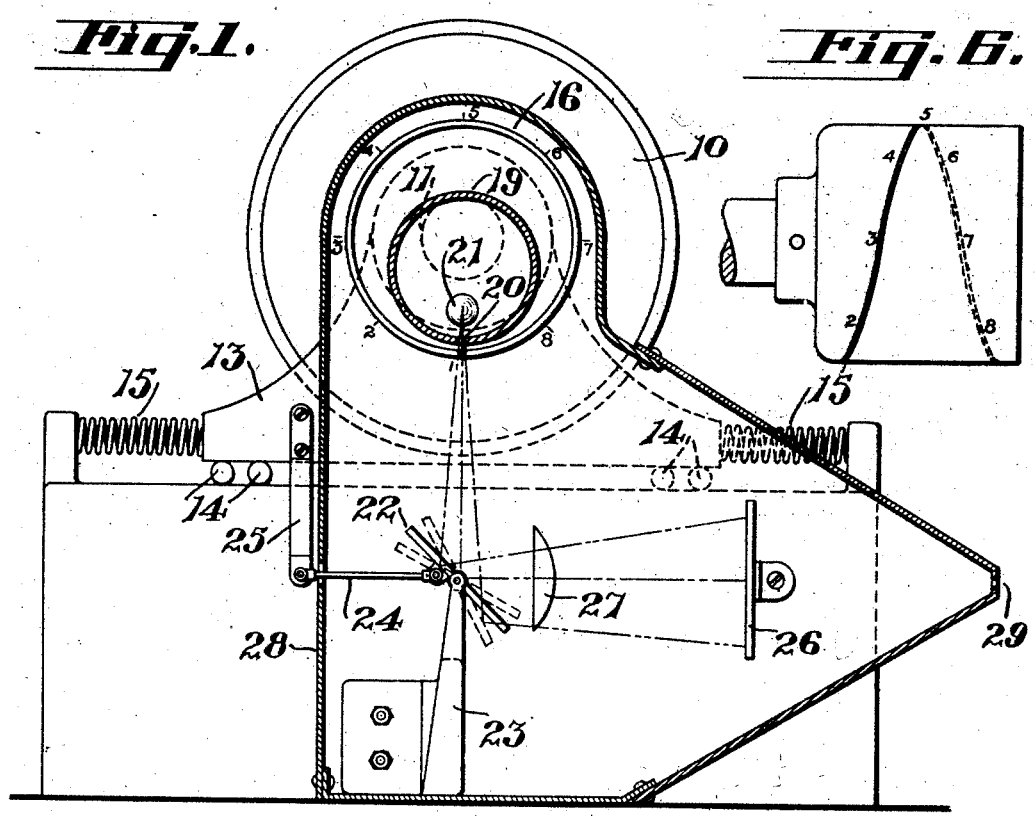
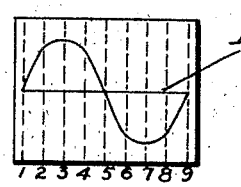
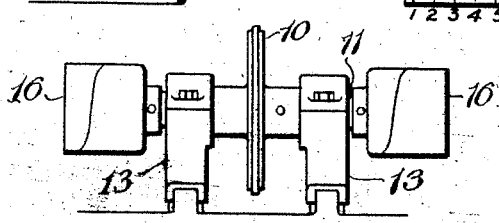
INVENTOR.
JAMES P. BRADNER.
BY Dewey, Strong,
Townsend & Loftus.
ATTORNEYS.

Sept. 8, 1925.                                                                                 1,552,982
                                         J. P. BRADNER
              METHOD OF AND APPARATUS FOR MEASURING AND LOCATING DYNAMIC UNBALANCE
                                      Filed Nov. 5, 1923                    2 Sheets-Sheet 2
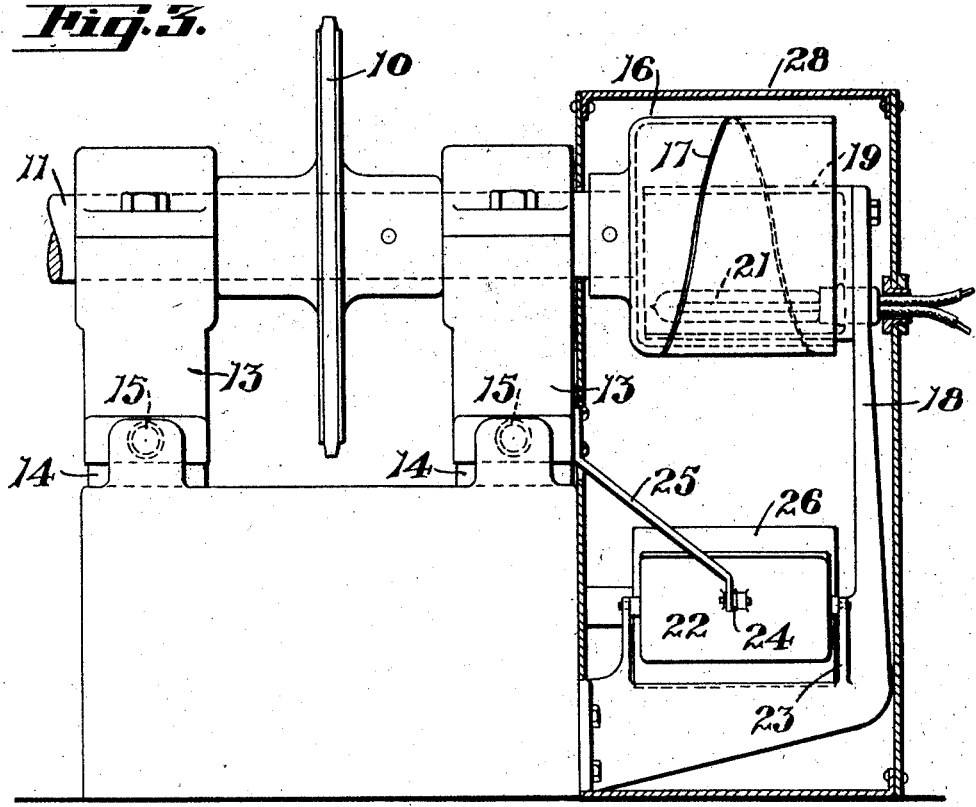
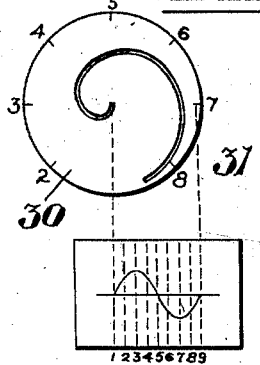
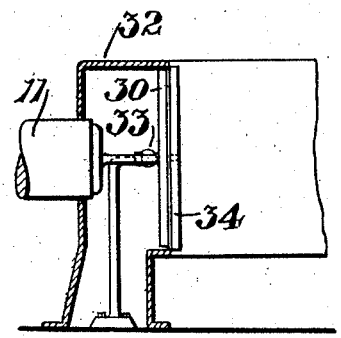
INVENTOR.
JAMES P. BRADNER.
BY Dewey, Strong,
Townsend & Loftus.
ATTORNEYS.

Patented Sept. 8, 1925.

1,552,982

UNITED STATES PATENT OFFICE.

JAMES P. BRADNER, OF SAN FRANCISCO, CALIFORNIA.

METHOD OF AND APPARATUS FOR MEASURING AND LOCATING DYNAMIC UNBALANCE.

Application filed November 5, 1923. Serial No. 672,821.

*To all whom it may concern:*

Be it known that I, JAMES P. BRADNER, citizen of the United States, residing in the city and county of San Francisco and State of California, have invented new and useful Improvements in Methods of and Apparatus for Measuring and Locating Dynamic Unbalance, of which the following is a specification.

This invention relates to a method of and apparatus for measuring and locating an unbalanced condition in a rotating element.

The object of the invention is to show graphically the magnitude of unbalance, if any, and to locate the approximate point of such unbalance in a rotating element of high or low speed.

In carrying out this object, I provide a novel mechanism for attachment to the rotating element to be tested, said mechanism being adapted to project a pencil-ray of light upon a screen or the like, and operating in such a manner that when the rotating element is in a perfect state of balance the ray of light will be shifted along a straight line, whereas when the rotating element is unbalanced the ray of light will follow a curved line upon the screen. The extent of curvature in the line and the location of the high points thereon on the screen will serve to show the magnitude of the unbalanced condition, and also to identify the approximate point in the rotating element where the unbalanced condition obtains.

One form which my invention may assume is exemplified in the following description and illustrated in the accompanying drawings, wherein—

Fig. 1 shows an end elevation partly in section of the mechanism embodying my invention, applied to a rotating element.

Fig. 2 shows a front elevation of the screen on which the ray of light is projected.

Fig. 3 shows a side elevation, partly in section, of the mechanism shown in Fig. 1.

Fig. 4 shows a side elevation of a modified arrangement of the lamp and housing and rotating shield.

Fig 5 shows a diagram of the said modified arrangement.

Fig. 6 shows a detail view in side elevation of the cylindrical shield which surrounds the lamp and housing.

Fig. 7 shows a modification of the invention in side elevation.

Merely by way of example, I show in the drawings a turbine wheel 10 as representing the rotating element to be tested. This is mounted on a shaft 11 having one or both bearings in a vibratory block or pedestal 13. These blocks or pedestals are shown as being mounted upon rollers 14 and held yieldingly in position by pressure springs 15.

On one end of the shaft is carried a cylinder 16 having a narrow slot 17 cut on a true spiral and making one full turn. Within the cylinder 16 and fixed upon a stationary bracket or arm 18 is a cylinder 19, formed with a narrow slot 20 extending parallel with the axis of said cylinder. Mounted within the stationary cylinder 19 is a lamp 21, the light from which shines through the slot 20 and escapes in the form of a pencil-ray through that part of the spiral slot 17 which crosses the slot 20. Due to the spiral form of the slot 17, this pencil-ray will shift from one end of the cylinder to the other with each revolution of the cylinder 16.

The ray of light is directed upon a mirror 22 pivotally mounted upon a bracket 23. To one side of the pivot of the mirror is attached a rod 24, which connects in turn with an arm 25 rigidly connected with the vibratory bearing block 13. The ray of light falling upon the mirror 22 is reflected upon a screen 26, and for greater concentration or focus may be passed through a suitable lens 27. In case a simple lens is used, the curve thrown upon the screen will be inverted but maintain the same relative relation.

In the operation of the device, if the rotating element being tested is in proper dynamic balance, the ray of light on the screen will form a straight line, as indicated at "A" in Fig. 2. However, if the rotating element be out of balance, then the vibrations of bearing block 13 will cause the mirror to oscillate as indicated by dotted lines in Fig. 1, and the result will be a curve on the screen, as shown by dotted lines in Fig. 2. The magnitude of this curve will show the extent to which the revolving element is out of balance, and the position of the high point above the normal line "A" and the low point below the normal line, will indicate the points at which weight should be added to or deducted from the rotating element in order to bring about a balanced condition.

The location of the unbalanced points in the rotating element can be determined readily by calibrating the cylinder 16. I show this cylinder equally divided into eight numbered segments. The screen may be similarly marked with vertical lines, so as to correspond with the markings on the cylinder 16. Therefore, if the high point in the curve occurs on the line 3 of the screen and the low point on the line 7, the exact segment of the rotating element where the unbalanced condition exists can be located by reference to the corresponding numbers on the rotating cylinder 16.

It will be understood, of course, that the shifting of the light-ray will be so rapid in the operation of the device as to form a continuous line upon the screen.

In order to exclude all light from the screen except that of the pencil-ray, I prefer to enclose the entire optical mechanism in a housing such as indicated at 28, and provide said housing with an eye-piece 29, through which the screen may be observed.

Various modifications in the construction and arrangement of the several parts herein shown and described may be resorted to without departing from the spirit of my invention as disclosed in the appended claims.

For example, a disk 30 with a volute slot 31 extending therethrough may be employed in place of the cylinder 16, as shown in Figs. 4 and 5. This disk is mounted on the end of the shaft of the rotating element to be balanced. Between the rotating disk and the element to be balanced is a housing 32 to exclude outside light and arranged within said housing is a lamp 33.

Outside of and close to the face of the disk 30 and mounted on an independent and rigid support is a plate 34. This plate as shown in Fig. 5 has a narrow slot 35 cut through from center to near circumference and is mounted with slot radial from center to circumference of disk. The pencil-ray of light passing through the two slots 31—35 may be projected upon a screen as outlined above. The resulting curve will be a straight line when the element is in perfect balance and will assume a form similar to the above described curve when the element is out of balance.

It is not essential that the rotating cylinder with the spiral slot, or the revolving disk with the volute slot, be directly mounted on the shaft which carries the element to be tested for balance. These elements may be connected to the main shaft by means of a flexible shaft or other suitable positive drive so as to run in synchronism with the rotating element to be balanced. This arrangement however would necessitate independent bearings mounted on rigid pedestals to carry the revolving cylinder or disk. Other parts of the mechanism would remain relatively the same.

Other modifications than those described above and illustrated in the drawings may be made without departing from the spirit of the invention; for instance the location and relative arrangement of the cylinders or the disk and plate with relation to each other, may be varied. Other forms of mounting, than the rollers 14 may be provided for the bearing block 13, so long as it permits said block to vibrate in the desired manner.

In case the rotating element 11 to be balanced assumes the shape of a cylinder of some length, as shown in Fig. 7, one device may be attached at each end of the shaft so as to produce two records at the same time. The comparison of records obtained in this manner will indicate the longitudinal position or point where weight should be added or deducted. This arrangement will require two vibratory bearings or bearing pedestals 13.

What I claim and desire to secure by Letters Patent is:

1. A method of testing rotating elements for balance, which consists in mounting the said element in a vibratory bearing, arranging in juxtaposition therewith a source of light, directing the light through a narrow, rectilinear aperture, connecting a shield for joint rotation with the element being tested, providing said shield with a transparent portion so shaped and arranged with respect to said rectilinear aperture as to permit the escape of a single pencil ray through said aperture, shiftable from end to end of the said aperture during each revolution of the shield.

2. A method of testing rotating elements for balance, which consists in mounting the said element in a vibratory bearing, arranging in juxtaposition therewith a source of light, directing the light through a narrow, rectilinear aperture, connecting a shield for joint rotation with the element being tested, providing said shield with a transparent portion so shaped and arranged with respect to said rectilinear aperture as to permit the escape of a single pencil ray through said aperture, shiftable from end to end of the said aperture during each revolution of the shield, directing said pencil ray upon a suitable reflector, and causing said reflector to oscillate in accordance with the movements of the vibratory bearing.

3. A method of testing rotating elements for balance, which consists in mounting the said element in a vibratory bearing, arranging in juxtaposition therewith a source of light, directing the light through a narrow, rectilinear aperture, connecting a shield for joint rotation with the element being tested, providing said shield with a transparent portion so shaped and arranged with respect to said rectilinear aperture as to permit the escape of a single pencil ray through said aperture, shiftable from end to end of the said aperture during each revolution of the shield, directing said pencil ray upon a suitable reflector, causing said reflector to oscillate in accordance with the movements of the vibratory bearing, and directing the reflected ray upon a calibrated surface which will depict the fluctuations of the ray and identify the approximate point in the rotating element where the unbalanced condition obtains.

4. An apparatus for testing rotating elements for balance, comprising a resiliently mounted vibratory bearing for the element to be tested, a lamp and housing therefor, the latter provided with a rectilinear aperture, a shield carried by the rotating element and provided with a tortuous aperture traversing the first-named aperture from end to end during each revolution.

5. An apparatus for testing rotating elements for balance, comprising a resiliently mounted vibratory bearing for the element to be tested, a lamp and housing therefor, the latter provided with a rectilinear aperture, a shield driven by the rotating element and provided with a tortuous aperture traversing the first-named aperture from end to end during each revolution, a pivoted mirror on which the projected ray of light is cast, and a connection between the pivoted mirror and the vibratory bearing to cause the said mirror to oscillate in accordance with the movements of the vibratory bearing.

6. An apparatus for testing rotating elements for balance, comprising a resiliently mounted vibratory bearing for the element to be tested, a lamp and housing therefor, the latter provided with a rectilinear aperture, a shield driven by the rotating element and provided with a tortuous aperture traversing the first-named aperture from end to end during each revolution, a pivoted mirror on which the projected ray of light is cast, and a connection between the pivoted mirror and the vibratory bearing to cause the said mirror to oscillate in accordance with the movements of the vibratory bearing, and means to receive and depict the reflected ray.

7. An apparatus for testing rotating elements for balance, comprising a resiliently mounted vibratory bearing for the element to be tested, a lamp and housing therefor, the latter provided with a rectilinear aperture, a shield driven by the rotating element and provided with a tortuous aperture traversing the first-named aperture from end to end during each revolution, a pivoted mirror on which the projected ray of light is cast, and a connection between the pivoted mirror and the vibratory bearing to cause the said mirror to oscillate in accordance with the movements of the vibratory bearing, and means to receive and depict the reflected ray, said shield and receiving means being calibrated whereby to identify and determine the location of the unbalanced area in the rotating element.

8. An apparatus for testing rotating elements for balance, comprising a resiliently mounted vibratory bearing, a lamp and housing carried upon a stationary support and arranged in juxtaposition with the rotating element, a cylindrical shield carried by and rotatable with the element to be tested, and having a spiral slot to control the aperture in the lamp housing, a pivoted mirror on which the ray of light passing through the shield is directed, connecting means between the pivoted mirror and the vibratory bearing to cause the mirror to oscillate in accordance with the vibrations of the rotating element, a surface upon which the reflected ray is cast, and a housing to exclude light other than the said ray, from the receiving surface, said housing being provided with an eye-piece through which the said receiving surface may be viewed.

9. A method of testing a rotating element for balance, which consists of rotating in unison with such element a suitable shield placed adjacent to an elongated light-emitting aperture so that a pencil-ray of light will be projected in a manner to shift from end to end of the aperture during one revolution of the rotating element, projecting such shiftable ray upon a suitable reflector and causing the reflector to oscillate in accordance with the vibrations of the rotating element.

10. A method of testing a rotating element for balance, which consists of rotating in unison with such element a shield placed adjacent to an elongated aperture of a lamp house so that a pencil-ray of light will be projected in a manner to shift from end to end of the aperture during one revolution of the rotating element, projecting such shiftable ray upon a suitable reflector and causing the reflector to oscillate in accordance with the vibrations of the rotating element, and directing the reflected ray upon a suitable screen or photographic plate for observation or record.

JAMES P. BRADNER.